United States Patent
Haddad, Jr.

(10) Patent No.: US 6,250,709 B1
(45) Date of Patent: *Jun. 26, 2001

(54) VEHICLE MOUNTED COVERING SYSTEM

(75) Inventor: Edward N. Haddad, Jr., Worcester, MA (US)

(73) Assignee: Pioneer Consolidated Corporation, North Oxford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/304,751

(22) Filed: May 4, 1999

Related U.S. Application Data

(63) Continuation-in-part of application No. 09/251,961, filed on Feb. 17, 1999, which is a continuation-in-part of application No. 09/229,017, filed on Jan. 12, 1999, now Pat. No. 6,089,645.

(51) Int. Cl.$^7$ .................................................... B60P 7/04
(52) U.S. Cl. ................ 296/98; 296/100.01; 296/100.15; 296/100.16
(58) Field of Search ........................ 296/98, 101, 100.01, 296/100.11, 100.15, 100.16; 160/68, 69, 72, 71

(56) References Cited

U.S. PATENT DOCUMENTS

| | | |
|---|---|---|
| 3,549,197 | 12/1970 | Sibley .................................. 296/100 |
| 3,868,142 | 2/1975 | Bachand et al. ....................... 296/98 |
| 4,050,734 | 9/1977 | Richard ................................. 296/98 |
| 4,341,416 | 7/1982 | Richard ................................. 296/98 |
| 4,516,802 | 5/1985 | Compton ............................... 296/98 |
| 4,740,029 | 4/1988 | Tuerk ................................... 296/100 |
| 4,842,323 * | 6/1989 | Trickett ................................. 298/98 |
| 5,031,955 | 7/1991 | Searfoss ................................ 296/98 |
| 5,054,840 | 10/1991 | Wilhite ................................. 296/98 |
| 5,125,713 | 6/1992 | Willingham et al. .................. 296/98 |
| 5,179,991 * | 1/1993 | Haddad, Jr. ......................... 296/98 X |
| 5,205,605 | 4/1993 | Haddad ................................. 296/98 |

(List continued on next page.)

FOREIGN PATENT DOCUMENTS

| | | | |
|---|---|---|---|
| 581512 * | 2/1994 | (EP) ..................................... 296/98 |
| 2 288 581 | 10/1995 | (GB) . |
| 131835 * | 6/1987 | (JP) ..................................... 296/98 |
| 173740 * | 7/1988 | (JP) ..................................... 296/98 |
| 98/05527 | 2/1998 | (WO) . |

OTHER PUBLICATIONS

Publication: *Do It Right with Roll Rite, Tarp Systems and Components*, 1996 Roll–Rite Corporation Printed in the U.S.A. (4 pp.).

Primary Examiner—Joseph D. Pape
(74) Attorney, Agent, or Firm—Weingarten, Schurgin, Gagnebin & Hayes LLP

(57) ABSTRACT

A system for manipulating a transport container cover using a variable height gantry or other elevator mechanism. In one embodiment, a gantry supports an assembly for storing the cover including a winding mechanism, the gantry height being adjustable so that the cover may be raised above the top of the transport container for unfurling. In a second embodiment, the cover storage assembly is mounted on a dump truck body by a support which may include an elevator mechanism to raise the storage assembly above the container top. In a third embodiment, the storage assembly is mounted on the cab end of the tilt frame of a container truck. The tilt frame in its raised position, elevates the storage assembly above the container top. When the storage assembly is in the raised position the cover is unfurled over the top of the container and the cover is secured over the container by an attachment mechanism on the back end of the container or truck. The storage assembly is adjusted to a lower position for transporting the covered container. The storage assembly includes a winding mechanism for withdrawing the cover and re-rolling the cover. The winding mechanism may be operated by a hand crank, or may include a spring loaded roller, or may be motor driven.

21 Claims, 17 Drawing Sheets

U.S. PATENT DOCUMENTS

| | | | |
|---|---|---|---|
| 5,238,287 | 8/1993 | Haddad | 296/98 |
| 5,303,972 | 4/1994 | Heider et al. | 296/98 |
| 5,340,187 * | 8/1994 | Haddad, Jr. | 296/98 |
| 5,697,664 * | 12/1997 | Chenowth | 296/98 |
| 5,823,604 * | 10/1998 | Chenowth | 296/98 |
| 5,957,523 * | 9/1999 | Haddad, Jr. | 296/98 |

* cited by examiner

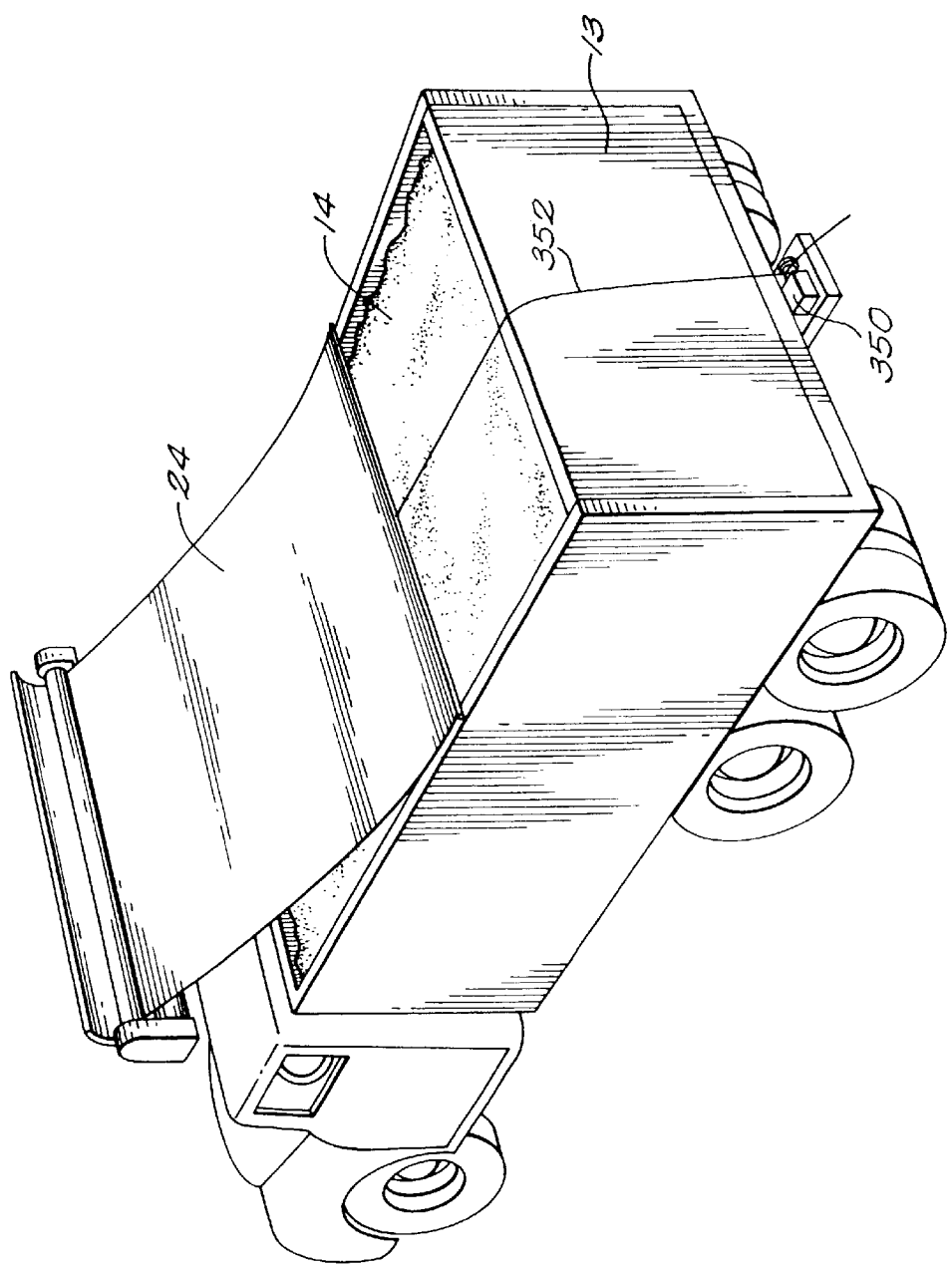

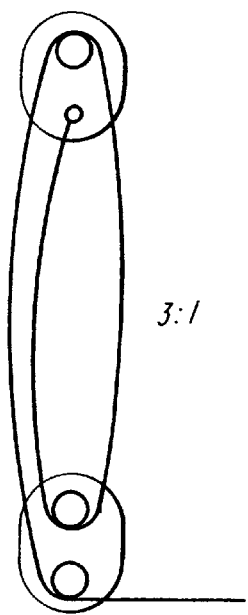 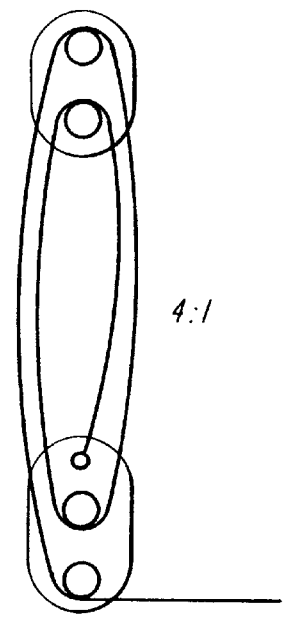
*FIG. 20A*  *FIG. 20B*

VEHICLE MOUNTED COVERING SYSTEM

CROSS REFERENCE TO RELATED APPLICATIONS

This application is a Continuation in Part of prior application Ser. No. 09/251,961 entitled "Variable Height Covering System" of Edward N. Haddad, filed Feb. 17, 1999 which is a Continuation in Part of prior application Ser. No. 09/229,017, entitled "Variable Height Covering System", of Edward N. Haddad, filed Jan. 12, 1999, now U.S. Pat. No. 6,089,645.

STATEMENT REGARDING FEDERALLY SPONSORED RESEARCH OR DEVELOPMENT

Not Applicable

FIELD OF THE INVENTION

The invention relates generally to transport container covers and more particularly to a system for manipulating a truck mounted container cover.

BACKGROUND OF THE INVENTION

Covers for transport containers, as found in or used with trucks, trailers and other transport vehicles, are necessary for many reasons. For example, such covers reduce the likelihood that the load being carried escapes, and also protect the load from the elements. Typically these covers are large and heavy, and therefore manipulating them manually is very difficult. Accordingly, various automated systems for manipulating transport container covers have been developed.

Some existing systems for manipulating truck container covers include telescopic arms deployed on opposite sides of the container to be covered. These arms are used to open and close the cover over the top of the container. Such systems may deploy the cover by extending the telescopic arms along the sides of the container. An example of such an existing system including a cover housing mounted on a retractable gantry is disclosed in U.S. Pat. No. 5,238,287, filed Aug. 14, 1992, of Edward N. Haddad, Jr.

While generally effective, covering systems including side mounted telescopic arms are not appropriate for all situations. For example, when a container being covered must be maneuvered in a relatively small area, the amount of clearance beyond the sides of the transport container may be minimal. In that circumstance, arms disposed beyond the sides of the container limit the maneuverability of the transport vehicle. Side mounted telescopic arms are also relatively expensive, and are susceptible to damage from inadvertent contact with walls or other vehicles.

For these reasons and others, it would be desirable to have a new system for covering a transport container. The new system should be conveniently operable by a single user, and should eliminate the need for any telescoping arms mounted to the sides of the container to be covered.

BRIEF SUMMARY OF THE INVENTION

In accordance with principles of the invention, there is disclosed a new system for manipulating a transport container cover using a variable height gantry or other elevator mechanism. In one embodiment, a variable height gantry supports an assembly for storing the cover and a clutch mechanism which operates to put the assembly for storing the cover into a freewheel mode. The gantry height is adjustable to a raised position such that the cover may be extended out of the storage assembly at a point above the top of the transport container. The system enables an operator to conveniently extend the cover over the top of the transport container when the gantry is in the raised position. In one version of this first embodiment, the assembly for storing the cover is put into the freewheel mode and then the cover may be manually extended over the container by the operator using a pull rope attached to one end of the cover. A motor may be provided to assist the operator in extending the cover and/or taking up any excess cover length when securing the cover over the container. Alternatively, the present system may be embodied without a motor. In such alternative embodiments, a hand crank or spring loaded roller may be included as part of the assembly. After the cover is extended out from the storage assembly, the operator uses an attachment mechanism on the end of the cover to secure it down over the top of the container. The gantry may be adjusted to a lower position for transporting the covered container.

The system is operable to withdraw the cover when the gantry is in its raised position. The gantry height may be adjusted hydraulically in response to a switch or lever, and the motor and clutch mechanism may be operated through radio or other signals generated by a wireless remote control.

In a second embodiment the cover storage assembly is mounted on a dump truck body, the mounting of which may include a hoist or elevator mechanism for raising the assembly above the top of the body. The cover may be unrolled manually or via motor power and the cover may be withdrawn or re-rolled into the assembly by motor operated or spring operated roller.

In a third embodiment, the cover storage assembly is mounted on the cab end of the tilt frame of a container truck. The tilt frame in its raised position provides elevation of the storage assembly without need for a separate hoist mechanism. As in the other embodiments the roller may be manually operable or motor driven to unroll and re-roll the cover, or the roller may be spring loaded for re-rolling of the cover.

When a spring loaded roller is employed or when a long cover is employed such as for long containers, the amount of force necessary to withdraw the cover from the storage assembly over the container may be more than an operator can comfortably provide. In a spring mounted roller the spring tension increases as the cover is unwound from the roller thereby requiring more and more force to completely unfurl the cover over the container. In such circumstances, any of the embodiments described above can employ a capstan, block and tackle or other device providing a mechanical advantage to reduce the amount of force required on the part of the operator to deploy the cover.

Another feature of the disclosed system is a pair of independently mounted feeders which axially swivel to guide the cover to and from the storage assembly as the cover is withdrawn or extended. The feeders for example operate in conjunction with a rope or wire rope attached to the outside edges of the cover. The feeders accommodate variations in height between the outside edges of the cover.

Other aspects of the illustrative embodiment include a stiffening tube at the end of the cover to provide stability along its width and a mechanism for securing the pull rope during and/or after unfurling of the cover.

Thus there is provided a new system for covering a transport container. The disclosed cover system does not extend significantly beyond the profile of the container during transport, thus allowing good maneuverability of the transport vehicle carrying or embodying the container. The disclosed system further does not require costly side mounted telescoping arms, and can accommodate a variety of container heights. The disclosed system is also conveniently operable by a single user.

BRIEF DESCRIPTION OF THE SEVERAL VIEWS OF THE DRAWING

The invention will be more fully understood by reference to the following detailed description of the preferred embodiments in conjunction with the drawings, of which:

FIG. 18 is a pictorial view of a truck and container illustrating a winch employed with the pull rope of the cover;

FIGS. 20A and 20B are diagrams of alternative block and tackle configurations.

DETAILED DESCRIPTION OF THE PREFERRED EMBODIMENTS

Figure 1:
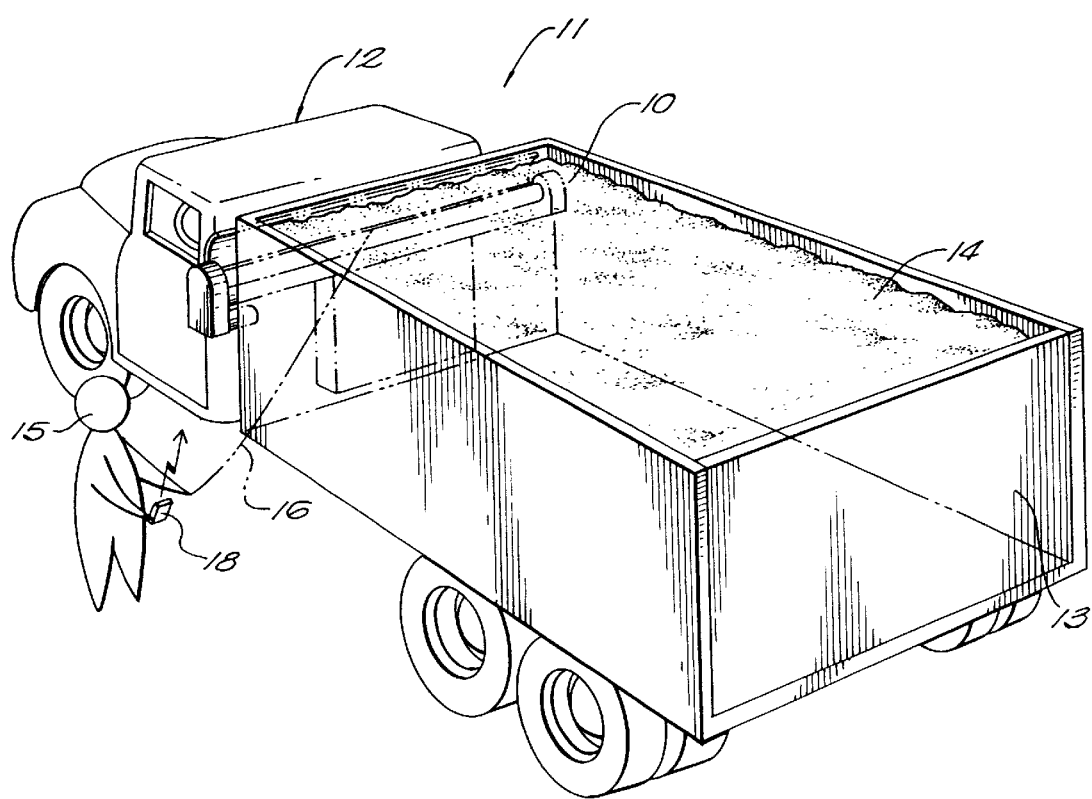
FIG. 1 is a pictorial view of an embodiment of a variable height covering system in a lowered position with the cover withdrawn, installed on a container truck.

FIG. 1 shows an embodiment of the disclosed variable height covering system 10 mounted on a truck 11. The covering system 10 is shown for purposes of illustration mounted between a truck cab 12 and a transport container 13 for holding a load 14. An operator 15 is shown holding a remote control 18 and a rope or line 16 that is attached to an end of a retracted flexible cover. The covering system 10 is shown in a lowered position such that the top of the covering system 10 does not extend significantly above the top of the truck cab 12, or the top of the transport container 13.

Figure 2:
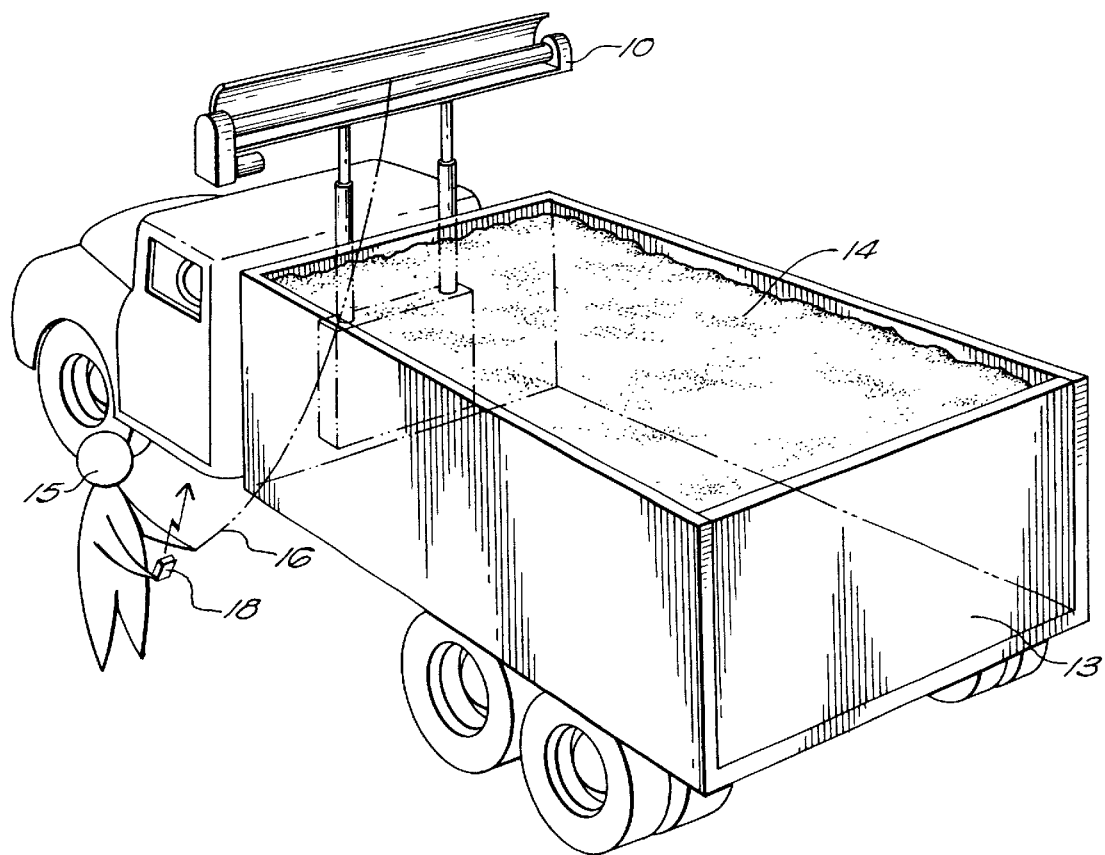
FIG. 2 shows the variable height covering system of FIG. 1 in a raised position.

FIG. 2 shows the covering system of FIG. 1 in a raised position. The height of the covering system 10 is for example adjusted by a hydraulic valve mounted to a gantry. The raised position of the covering system 10 raises an assembly for storing the cover so that the cover may be extended or withdrawn from a point above the top of the container 13 and the load 14 being transported. The operator 15 utilizes the remote control 18 to enable the assembly for storing the cover to release the cover. In a first exemplary embodiment, the cover storage assembly is enabled to release the cover through a freewheel mode of operation. In this first embodiment, a motor is supplied to assist in withdrawing the cover or in taking up excess cover length, when the storage assembly is not in the freewheel mode. When the assembly for storing the flexible cover is in the freewheel mode, the operator 15 may pull the rope 16 to extend the cover over the container 13, thus covering the load 14.

In a second embodiment, a bi-directional motor is provided to also assist in extending the cover out from the storage assembly, while the operator 15 guides the cover over the top of the container, as well as to assist the operator in withdrawing the cover and/or taking up any excess cover length when securing the cover.

Figure 3:
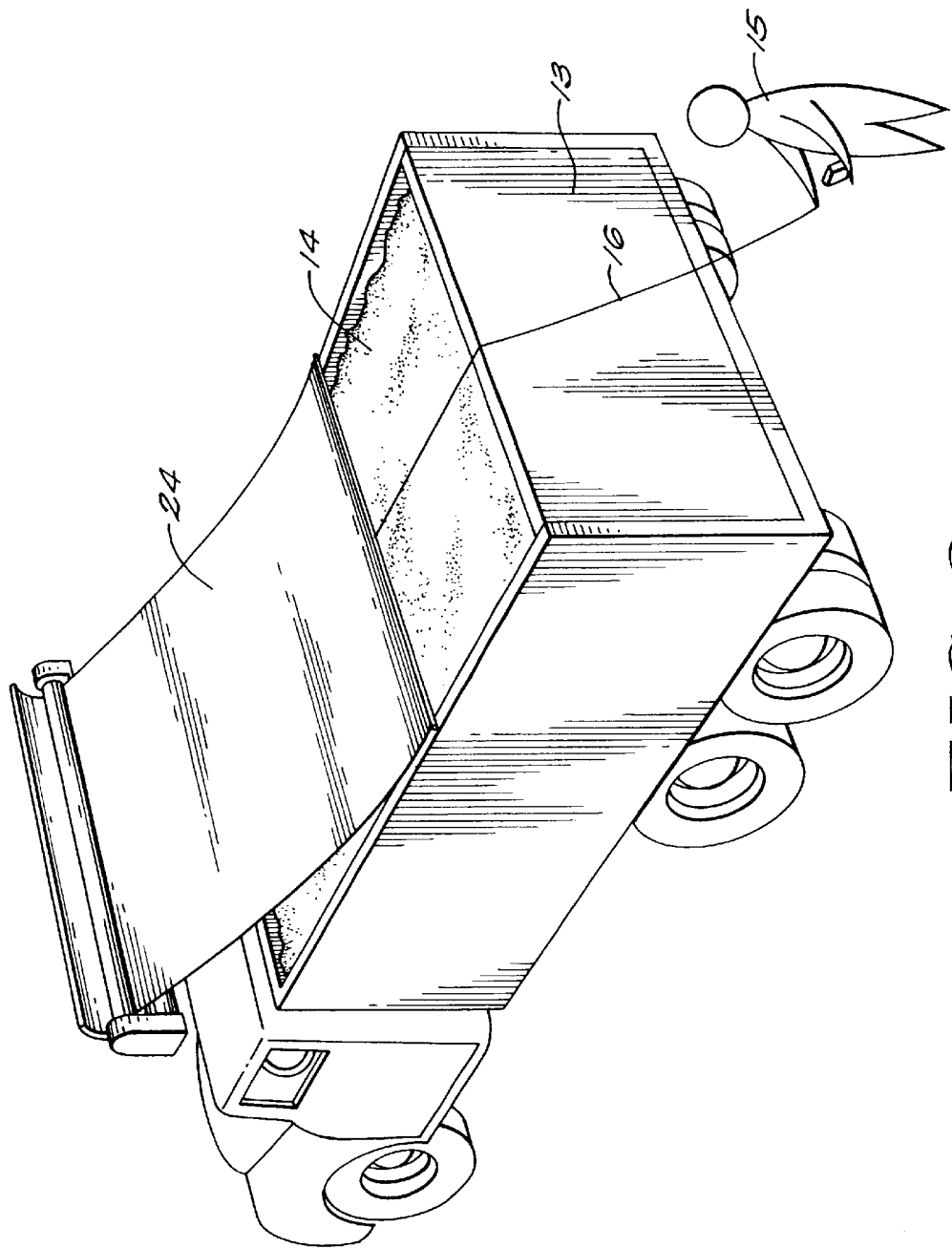
FIG. 3 shows the variable height covering system of FIG. 1 during extension of the cover over a container.
Figure 4:
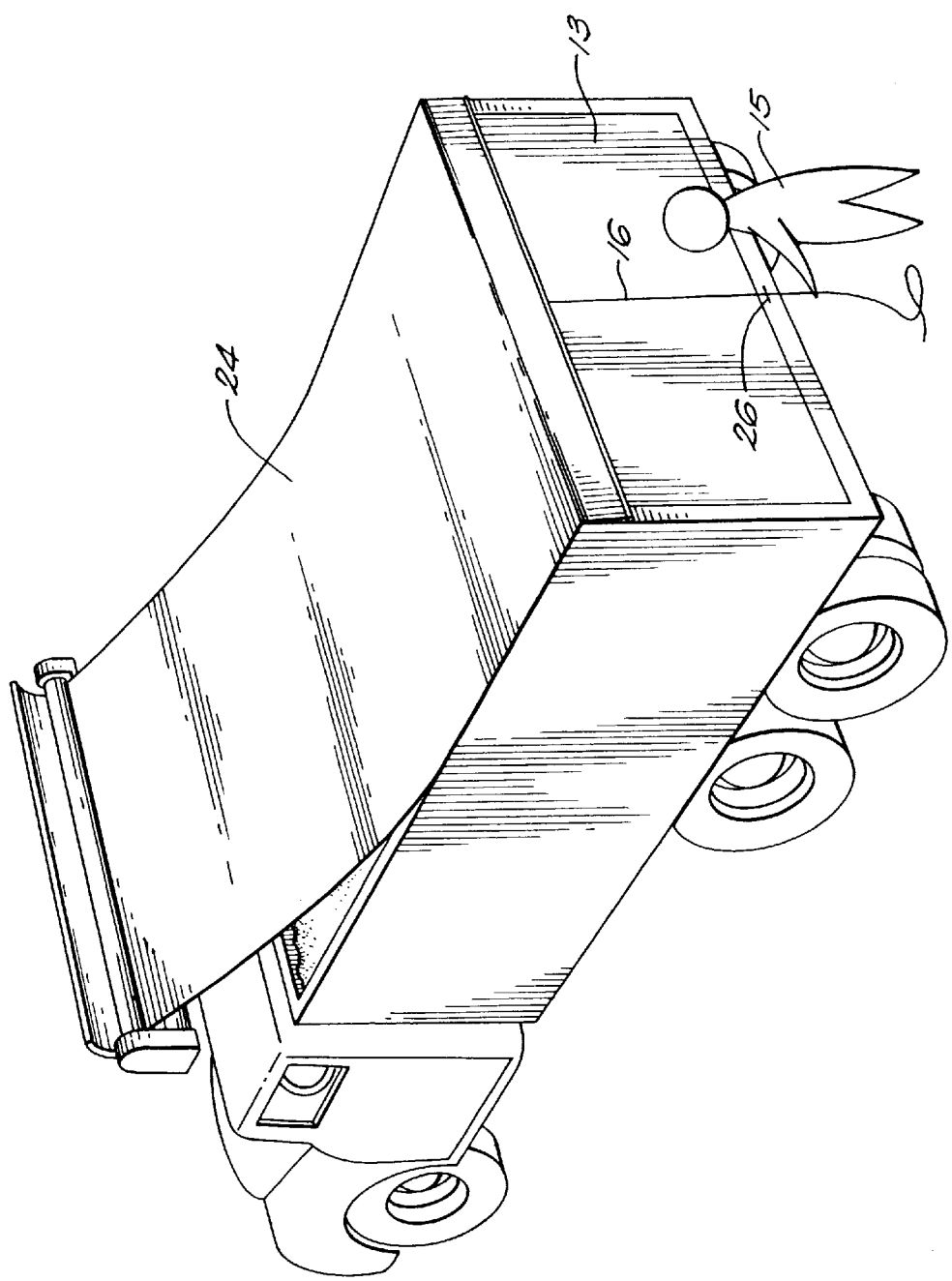
FIG. 4 shows the variable height covering system of FIG. 1 with the cover extended over the container.

FIG. 3 shows the operator 15 extending a flexible cover 24 over the top of the container 13 to cover the load 14 stored therein by pulling the rope 16 towards the back of the container 13. FIG. 4 shows the cover fully extended over the top of the container 13. Further in FIG. 4, the operator 15 is shown tying the rope 16 to an attachment point 26 in order to secure the cover 24 over the top of the container 13. While in the embodiment of FIG. 4 a rope is shown being tied to an attachment point to secure the cover 24, any other attachment system or mechanism may be used as an alternative or an addition to such tying of the rope. Such alternative attachment systems include hooks, rings, and other mechanisms which allow the rope to be easily secured and removed.

Figure 5:
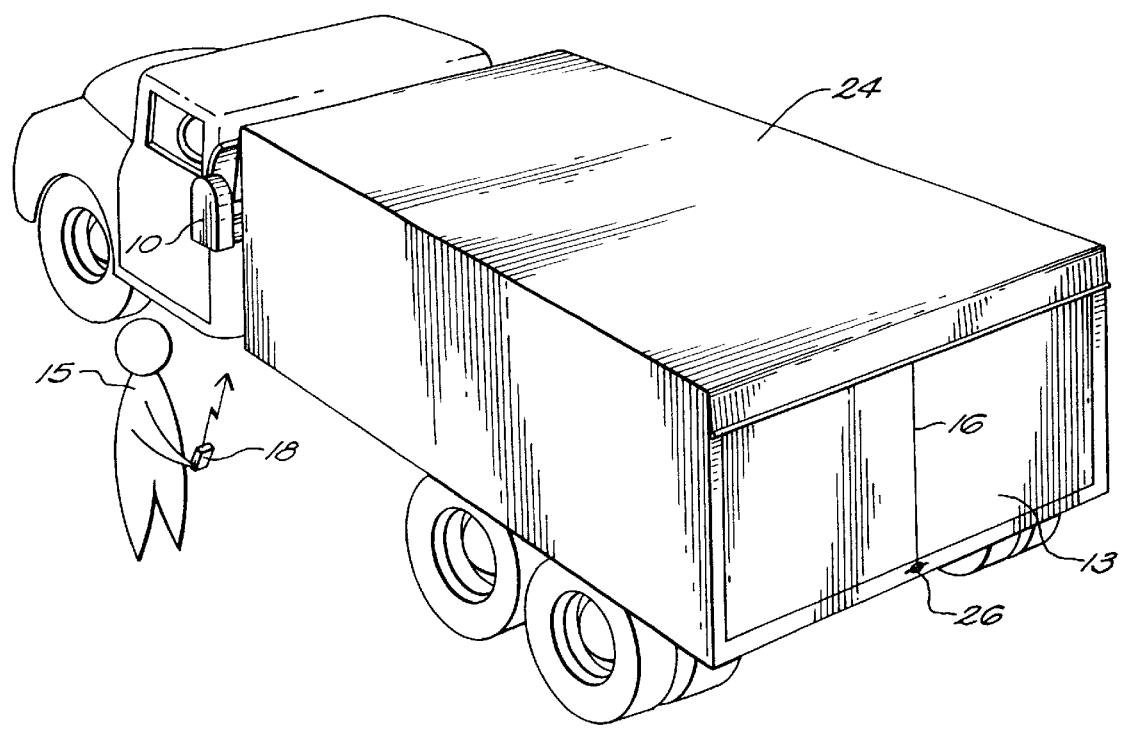
FIG. 5 shows the variable height covering system of FIG. 1 in a lowered position with the cover extended over the container and attached to an attachment point.

FIG. 5 shows the covering system 10 in a lowered position with the cover 24 fully extended over the top of the container 13, and having the cover 24 attached to the attachment point 26. The covering system 10 is adjusted to the lowered position by a hydraulic valve. The operator 15 takes the assembly for storing the cover out of the freewheel mode via the remote control 18. Any remaining slack in the cover 24 is then removed by way of a motor coupled to the assembly for storing the cover 24.

Figure 6:
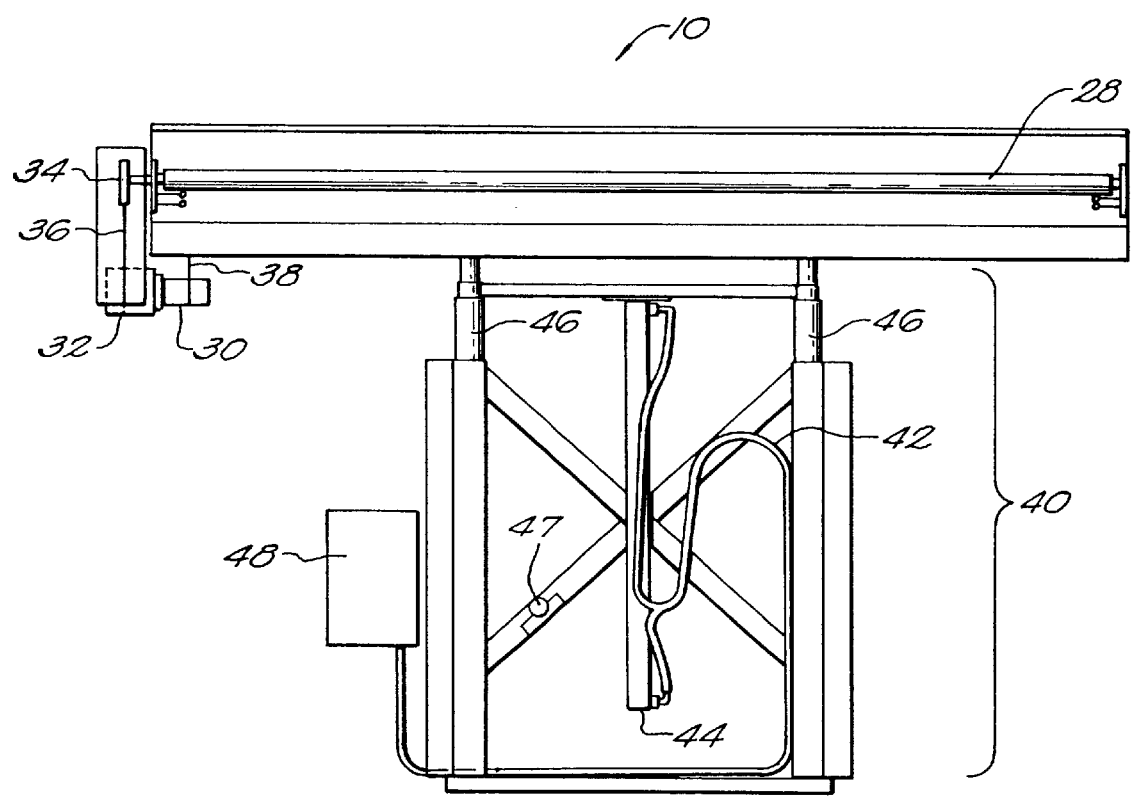
FIG. 6 is a front view of an embodiment of the disclosed variable height covering system in a lowered position.

FIG. 6 shows an exemplary embodiment of the covering system 10 in a lowered position. FIG. 6 includes an assembly for storing a flexible cover, including a roller 28 coupled to a uni-directional motor 30 having an electric clutch 32. The roller 28 is connected to a sprocket 34, around which a chain 36 is wound. The chain 36 is further coupled to the motor 30. When the electric clutch 32 is engaged, the roller 28 is put into a freewheel mode, allowing the cover to by unwound manually from the roller 28. When the clutch 32 is released, the roller 28 is locked, and the motor 30 may be activated via remote control to wind the flexible cover around the roller 28 so as to withdraw the cover. Additionally, when the electric clutch 32 is not engaged, the cover cannot be extended. When the electric clutch is engaged, the roller 28 is enabled to operate in a freewheel mode such that the cover may be manually extended over the top of the container.

Figure 7:
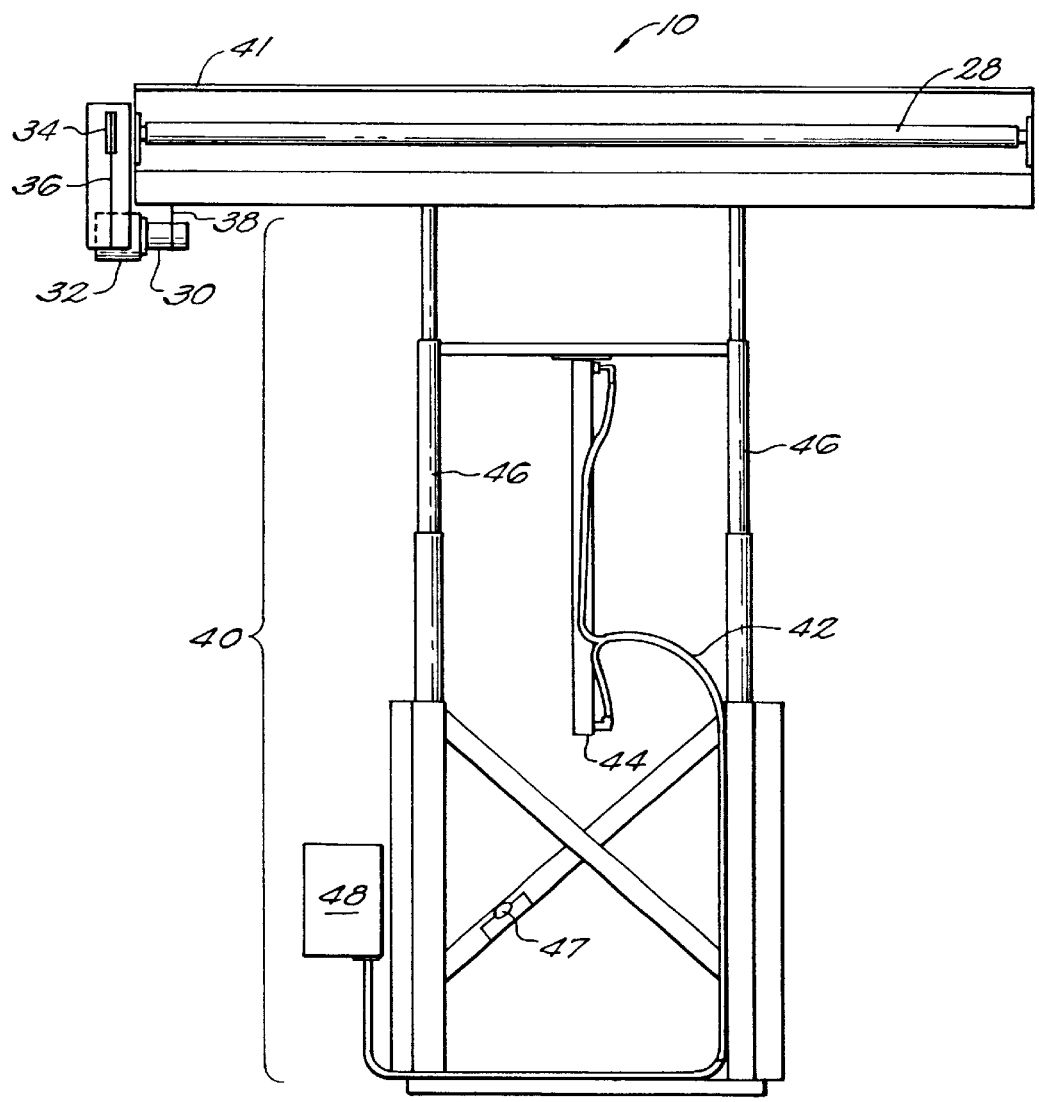
FIG. 7 is a front view of the variable height covering system of FIG. 6 in a raised position.

While a motor 30 and an electric clutch 32 are shown in FIG. 7 for purposes of illustration, the present invention is alternatively embodied without one or both of these elements. In such alternative embodiments, a mechanical clutch is provided to put the roller 28 into freewheel operation, and the cover may be withdrawn onto the roller 28 by manually turning the roller 28, for example by means of crank.

Further shown in FIG. 6 is a gantry 40 including telescoping arms 46 on which is supported a housing 41 containing the roller 28, and further supporting the motor 30 by means of a bracket 38. A hydraulic cylinder 44 is shown coupled via hose 42 to a hydraulic fluid source 48, and is used to adjust the height of the gantry 40.

An alarm 47 is shown attached to the gantry 40 for providing an alarm signal in the event that a height of the gantry 40 exceeds a predetermined level when the vehicle on which the container being covered prepares to move.

FIG. 7 shows the covering system of FIG. 6 in a raised position. The hydraulic cylinder 44 is used to adjust the height of the gantry 40 to any intended height between a minimum and a maximum. The maximum height may be designed such that the gantry 40 can be raised well above a load stored in the container being covered. In addition, the maximum height to which the gantry 40 may be adjusted can be selected so that a single embodiment of the disclosed covering system can be used in connection with various sized transport containers having a variety of heights. In an exemplary embodiment, the raised position of the covering system 10 as shown in FIG. 7 results in the assembly for storing the cover being raised approximately 48 inches above the top of the container to be covered.

For purposes of illustration, the hydraulic cylinder 44 is powered by a stand-alone electro-hydraulic power unit, such as hydraulic fluid source 48 as shown in FIG. 7. Alternatively, the hydraulic cylinder 44 may be powered by tapping into an existing hydraulic source on the transport vehicle as may be accomplished using a priority flow diverter in conjunction with a 4-way, open-centered directional control valve.

Figure 8:
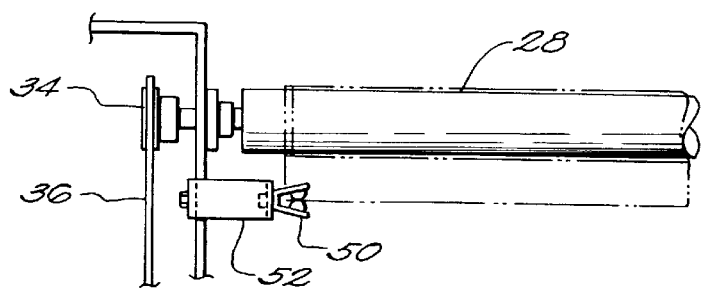
FIG. 8 is a front view of an embodiment of a winding mechanism and a feeder.

FIG. 8 shows elements in an embodiment of a winding mechanism for storing a flexible cover, together with a feeder 50, as embodied at one side of the roller 28. A feeder 50 is preferably mounted at both ends of the roller 28. The feeder 50 is shown mounted on a swivel bracket 52, permitting the feeder 50 to swivel axially in order to accommodate variations in height with regard to the sides of the cover as the cover is being fed onto or unrolled from the roller 28. In one embodiment the cover includes a profiling near its edge, such as by means of an attached wire rope, which is accommodated by the feeder 50.

Also shown in FIG. 8 are sprocket 34 and chain 36 which operate to rotate the roller 28, for example as a result of being driven by a motor.

Figure 9:
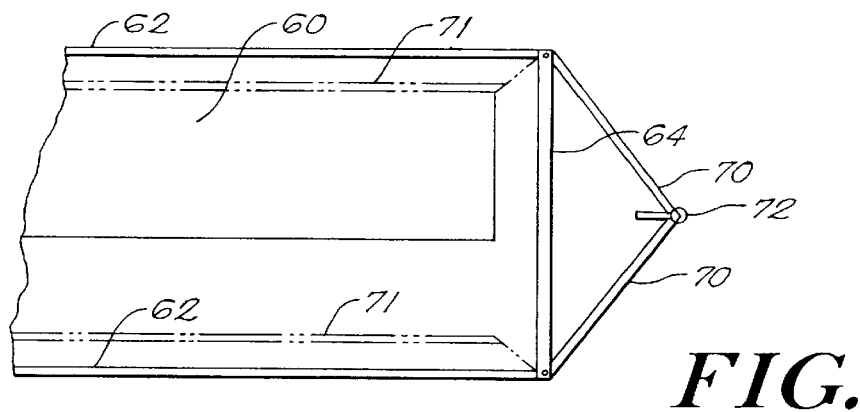
FIG. 9 is a top-rear view of an exemplary flexible cover.

FIG. 9 shows a flexible cover 60 which may be extended and/or withdrawn using the disclosed covering system. The cover 60 is composed substantially of a multi-mesh material, and includes a pair of wire ropes 62 disposed at its sides. A light weight aluminum tube 64 is shown within a pocket at the end of the cover 62 to provide lateral stability of the cover 60. A tapered end 70 of the cover 60 comes to a point at a ring 72. The ring 72 is an attachment mechanism used to secure the cover 60 to an attachment point such as a hook. A pair of flaps 71 are shown on the bottom of the cover 62, to be flipped down if needed to cover the load or container completely.

Figure 10:
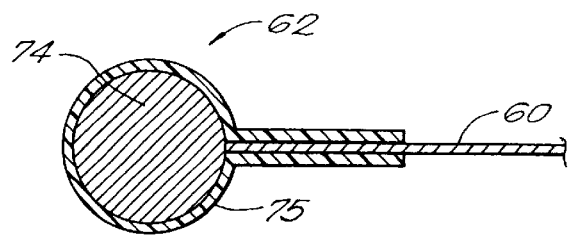
FIG. 10 is a cross section view showing a rope or wire rope attached to a side of a flexible cover.

FIG. 10 shows an illustrative embodiment of the wire rope 62 at the edges of the flexible cover manipulated by the disclosed covering system. The embodiment of FIG. 10 includes a plastic coated wire rope 74 encased in vinyl coated nylon 75, which is in turn attached to the multi-mesh material of flexible cover.

Figure 11:
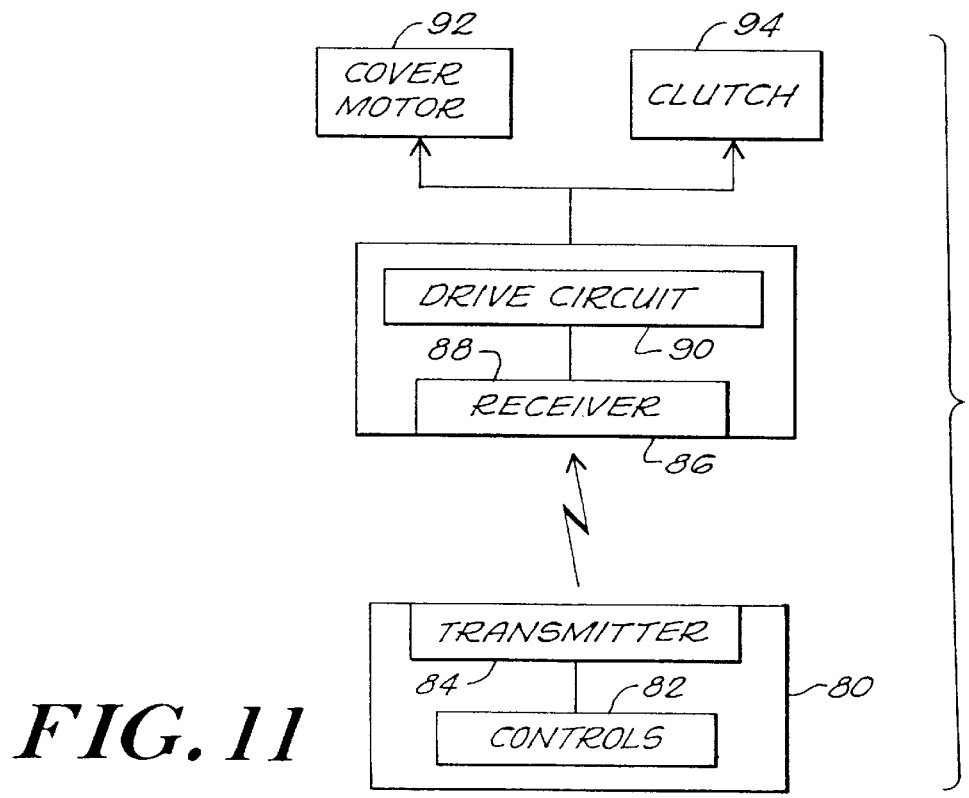
FIG. 11 is a block diagram showing a remote control unit and drive electronics.

FIG. 11 shows a remote control unit 80 including controls 82 coupled with a transmitter 84. Also shown in FIG. 11 is drive electronics 86 including a receiver 88 and a drive circuit 90. The drive circuit 90 is further communicative with a cover motor 92 and a clutch 94. The cover motor 92 for example corresponds to motor 30 as shown in FIGS. 6 and 7, the clutch 94 for example corresponds to the clutch 32 as shown in FIGS. 6 and 7.

Figure 12:
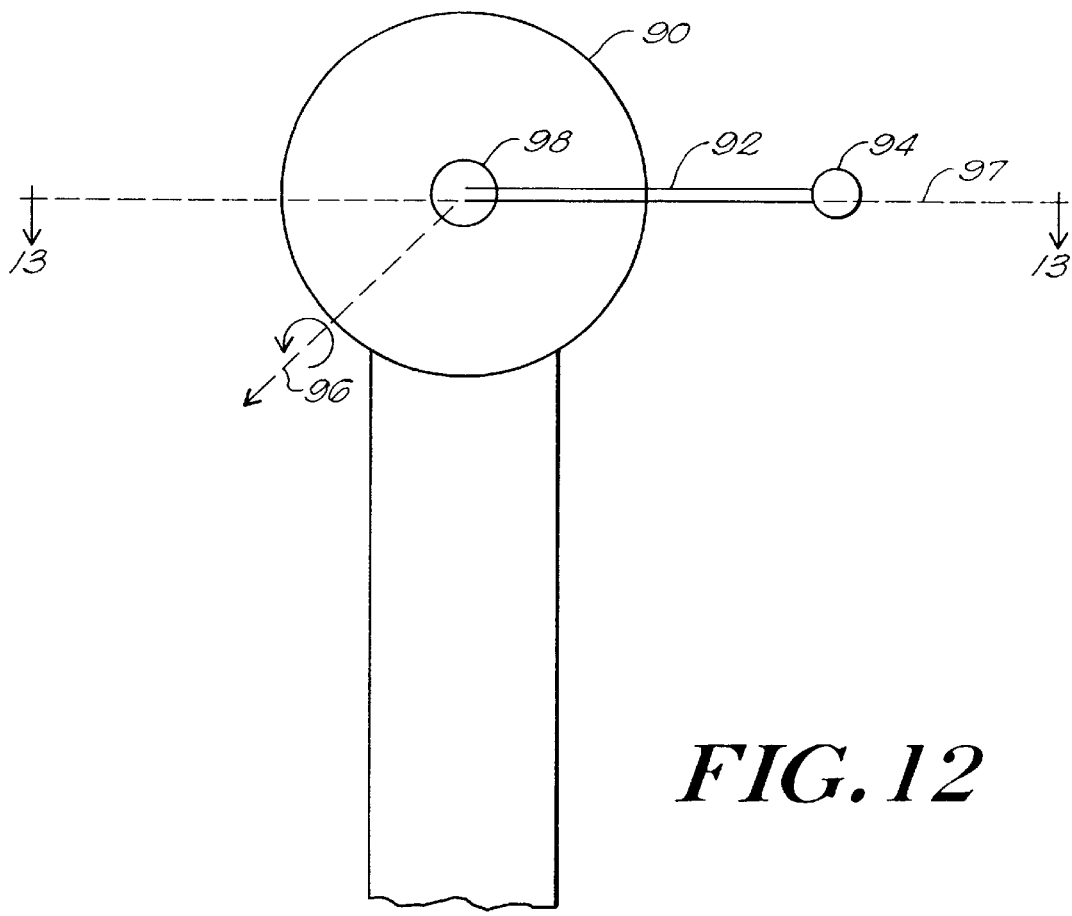
FIG. 12 is a cross sectional view showing an alternative embodiment of the present invention, including a winding mechanism operated by means of a hand crank.

During operation of the elements shown in FIG. 11, an operator asserts one or more of the operator controls 82, which causes transmission of a corresponding radio or other signal from the transmitter 84. The radio signal is received by the receiver 88 within the drive electronics 86, which are attached to the disclosed covering system. The drive circuit 90 processes the received radio signal and generates an electrical signal to one of the elements 92 and/or 94. The specific electrical signal generated depends on the specific radio signal received. For example, the controls 90 which operate the clutch 94 and/or the motor 92 cause corresponding radio signals to be transmitted from the transmitter 84 which in turn cause the drive circuit 90 to generate electrical signals to control the operation of the clutch 94 and the motor 92. In an alternative embodiment, the operation of the adjustable height gantry is also adjustable via the remote control unit 80. FIG. 12 shows an alternative embodiment of the disclosed system including a hand crank 90 for manually turning a roller 98 onto which the cover may be wound. An arm 92 is attached at one end to the crank 90, and has a handle 94 attached at an opposite end. During operation of the elements shown in FIG. 12, an operator may extend or retract the cover by gripping the handle 94 and turning the crank 90, whereby roller 98 is rotated around the axis 96. A second view of the crank shown in FIG. 12 is shown in FIG. 13 with relation to the plane 97.

Figure 13:
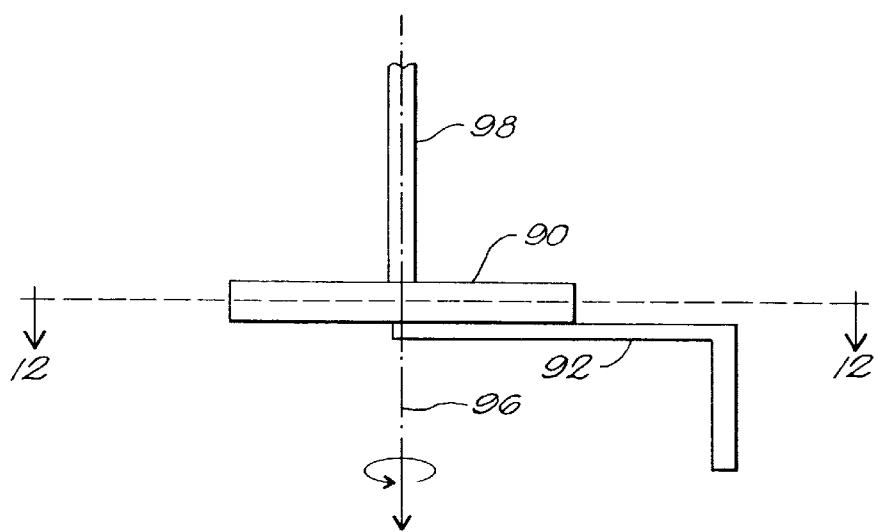
FIG. 13 is a top view of the winding mechanism show in FIG. 12.

FIG. 13 shows a top view of the crank 90 shown in FIG. 12. FIG. 13 shows the handle 94, arm 92 and roller 98, as shown also in FIG. 12.

In another alternative embodiment, the cover is stored by being wound around a spring loaded roller. An example of such a spring loaded roller is disclosed in U.S. Pat. No. 5,165,461 of Haddad, issued Nov. 24, 1992, the disclosure of which is hereby included by reference herein.

Figure 14:
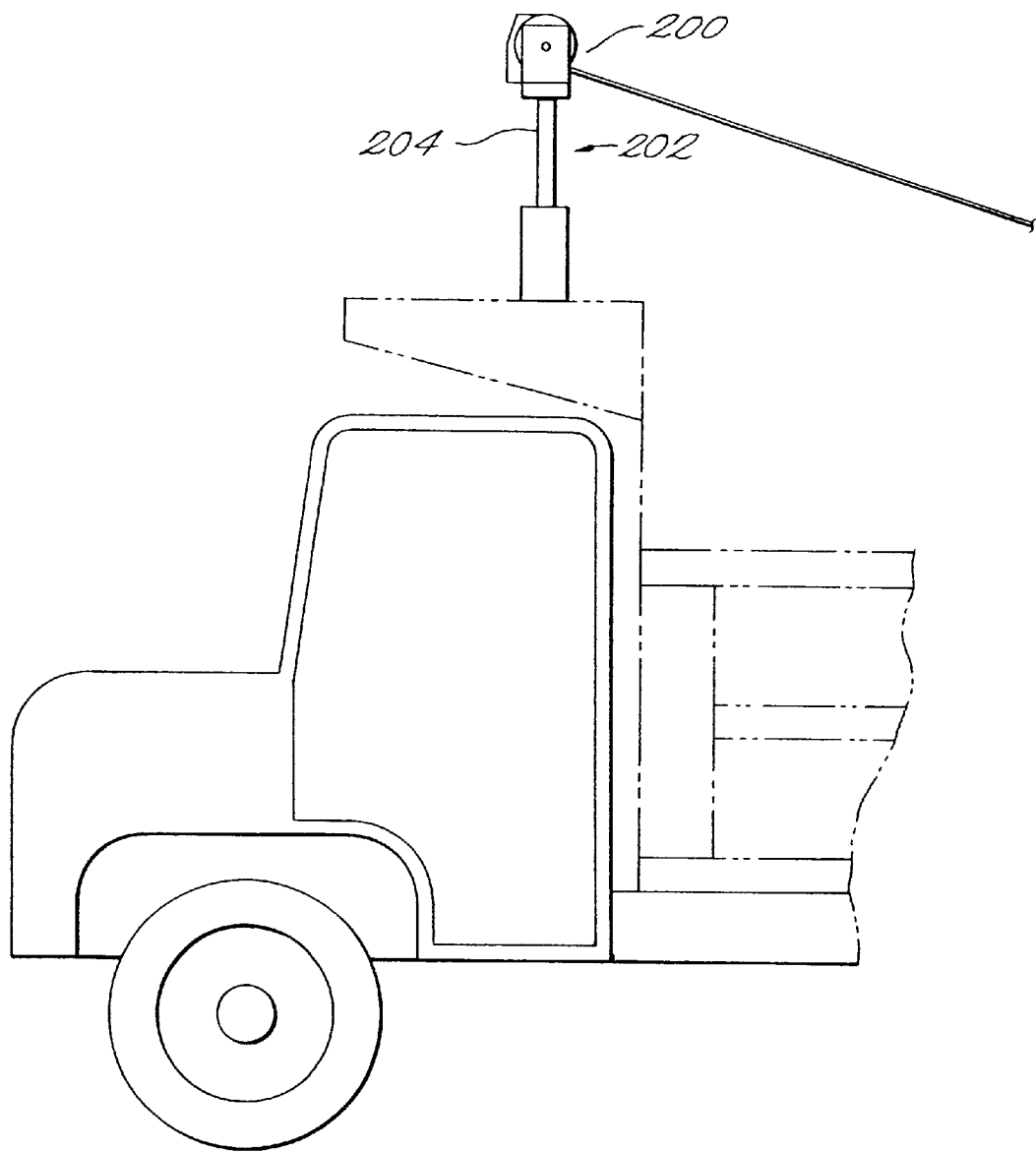
FIG. 14 is a cutaway side view of an embodiment of the invention with the storage roller mounted on a dump truck.

In another embodiment, illustrated in FIG. 14, the storage assembly 200 is mounted on the cab end of the container of a dump truck. As illustrated the storage assembly 200 is mounted on an elevator or hoist mechanism 202 mounted on the shield 201 of the dump truck body above the cab of the truck. The elevator mechanism 202 can include telescoping tubes 204 for raising and lowering the assembly 200 above the cab, or can be of any other suitable mechanism for raising and lowering the assembly. The elevator assembly is useful for increasing the elevation of the storage assembly when covering a heaped load in the dump truck body. After unfurling the cover over the load and securing the rearward end of the cover, the elevator mechanism can be lowered to position the cover over the load or open top of the container. The roller may be spring loaded, free wheeling or motor driven as in the above described embodiment.

Figure 15:
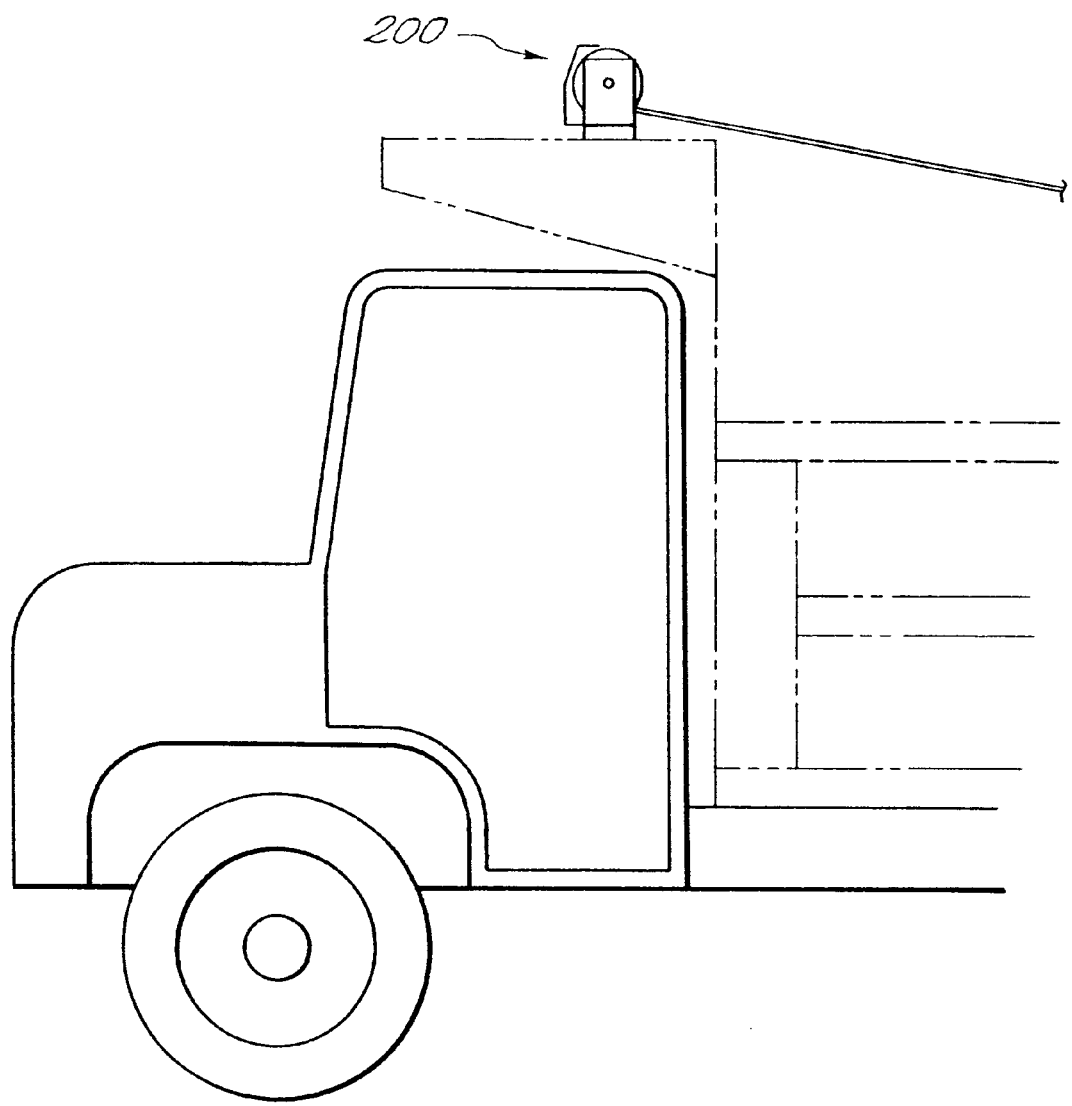
FIG. 15 is a cutaway side view of an alternative to the embodiment of FIG. 14.

In a further version of this dump truck embodiment, the storage assembly 200 can be mounted directly on the shield 201 as shown in FIG. 15 if the height of the shield is sufficient to not require the elevator mechanism.

Figure 16:
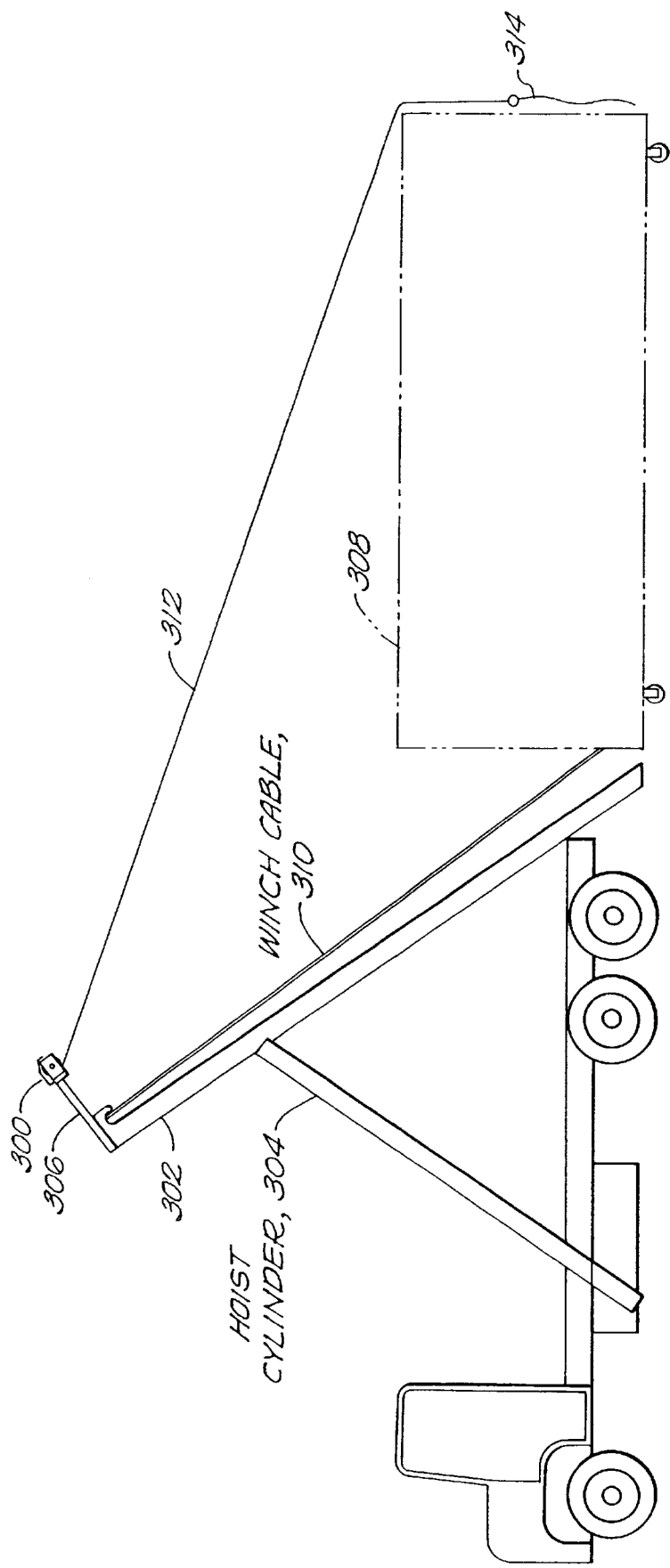
FIG. 16 is a side view of another embodiment of the invention with the storage roller mounted on an end of the tilt frame of a container truck and illustrating the tilt frame in a raised position.
Figure 17:
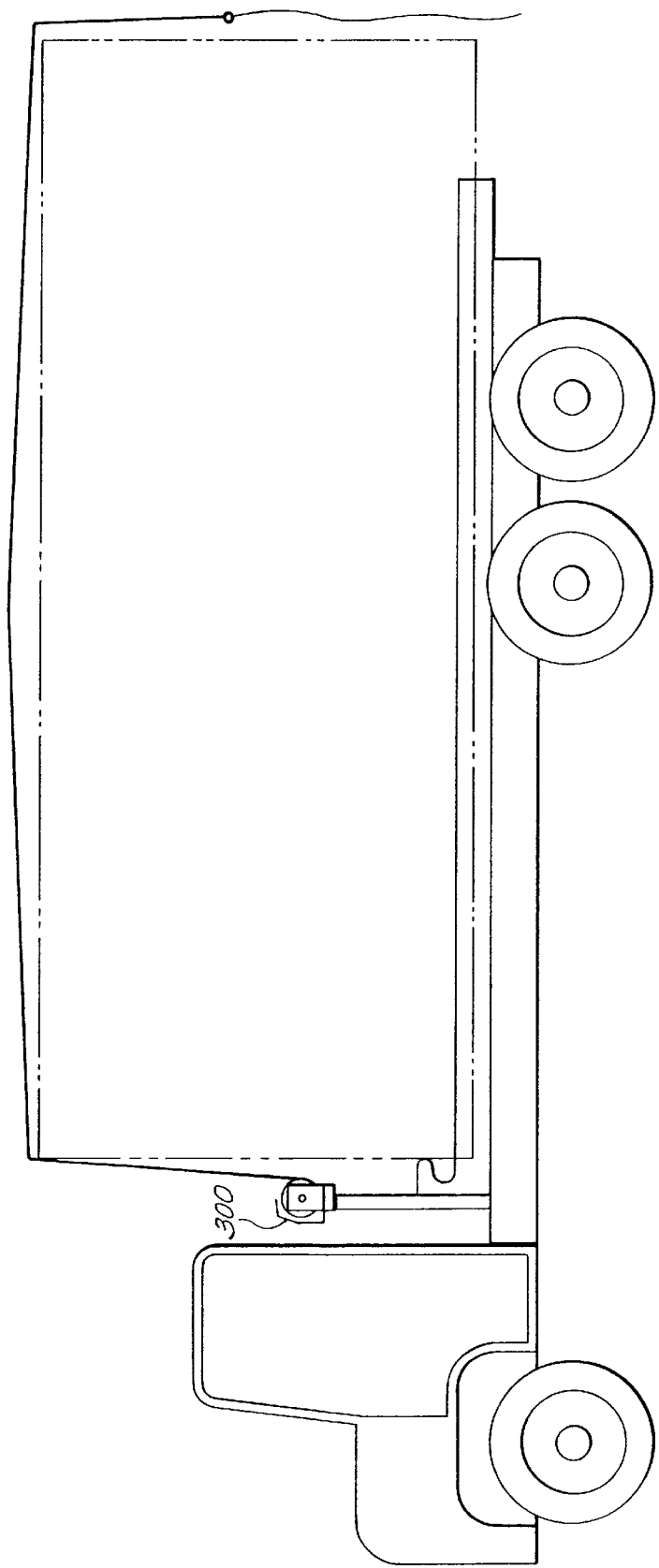
FIG. 17 is a side view of the embodiment of FIG. 16 with the tilt frame in the lowered position.

Another embodiment of the invention is illustrated in FIGS. 16 and 17 in which the storage roller 300 is mounted on the cab end of the tilt frame 302 of a container truck. The tilt frame 302 is shown in FIG. 16 in its raised position, and is raised by operation of a hoist cylinder 304 as is known. The storage assembly 300 is mounted on a bracket 306 at the cab end of the tilt frame 302. As in the above embodiments, the storage assembly may include a spring loaded roller, a motor driven roller or a manually driven roller for unfurling and re-furling of the cover. In use, the truck is backed into proximity with an end of a refuse container and a winch cable is attached to a fitting on the container end in known fashion in order to permit winching of the container onto the tilt frame. Before winching of the container onto the tilt frame, the cover 312 is unrolled from the storage assembly 300 and the end of the cover is secured by pull rope 314 to the outer end of the container 308. The container is then winched onto the tilt frame and as the container rides up onto the frame, the cover is wound back onto the roller of the storage assembly as the tilt frame lowers onto the truck bed. FIG. 17 illustrates the refuse container fully winched onto the tilt frame and the tilt frame in its lowered position. During the loading operation the container remains covered at least partially by the cover which extends over the open top, and the container becomes fully covered with the container in the seated position as shown in FIG. 17.

When a spring loaded roller is used there can be sufficient tension on the cover to make it difficult to manually unwind the cover over the container. This can also be the case for long covers even when a free wheeling roller is employed in the storage assembly. To overcome this difficulty a capstan winch or other suitable mechanism can be employed to aid the operator in unfurling the cover.

Referring to FIG. 18 there is shown a winch 350 such as a capstan winch or windlass mounted on the rear of the truck body and operative to engage the pull rope 352 attached to the end of the cover. The capstan winch may be electrically or hydraulically driven. The winch may also be manually driven and having a sufficient gear ratio to provide the intended mechanical advantage. The winch may be mounted on a movable support 354 which can be moved into a storage position when not in use.

Figure 18A:
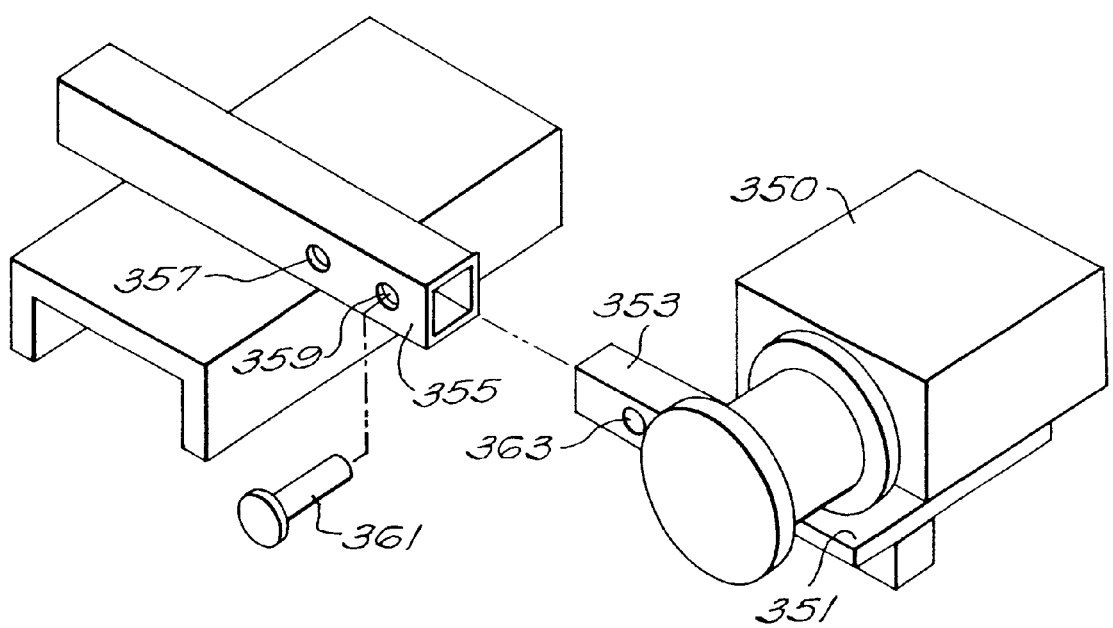
FIG. 18A is a pictorial view of a winch assembly moveable between stored and operative positions.

The winch can be mounted in a manner to be moveable between operative and stored portions, or may be removable from the vehicle when not needed. One example is shown in FIG. 18A, in which a winch 350 has a mounting plate 351 and slide tube 353. The slide tube is slidably inserted into receiver tube 355 attached to the truck chassis or tilt frame, and is moveable to an inward storage position denoted by hole 357. A retaining pin 361 is inserted through the intended holes 357 or 359 and cooperative hole 363 in the slide tube to secure the winch in the selected position. The winch can be mounted in various other ways to be moveable to a stored position. The winch may also be removable from its mounting such as by the assembly shown in FIG. 18A.

Figure 19:
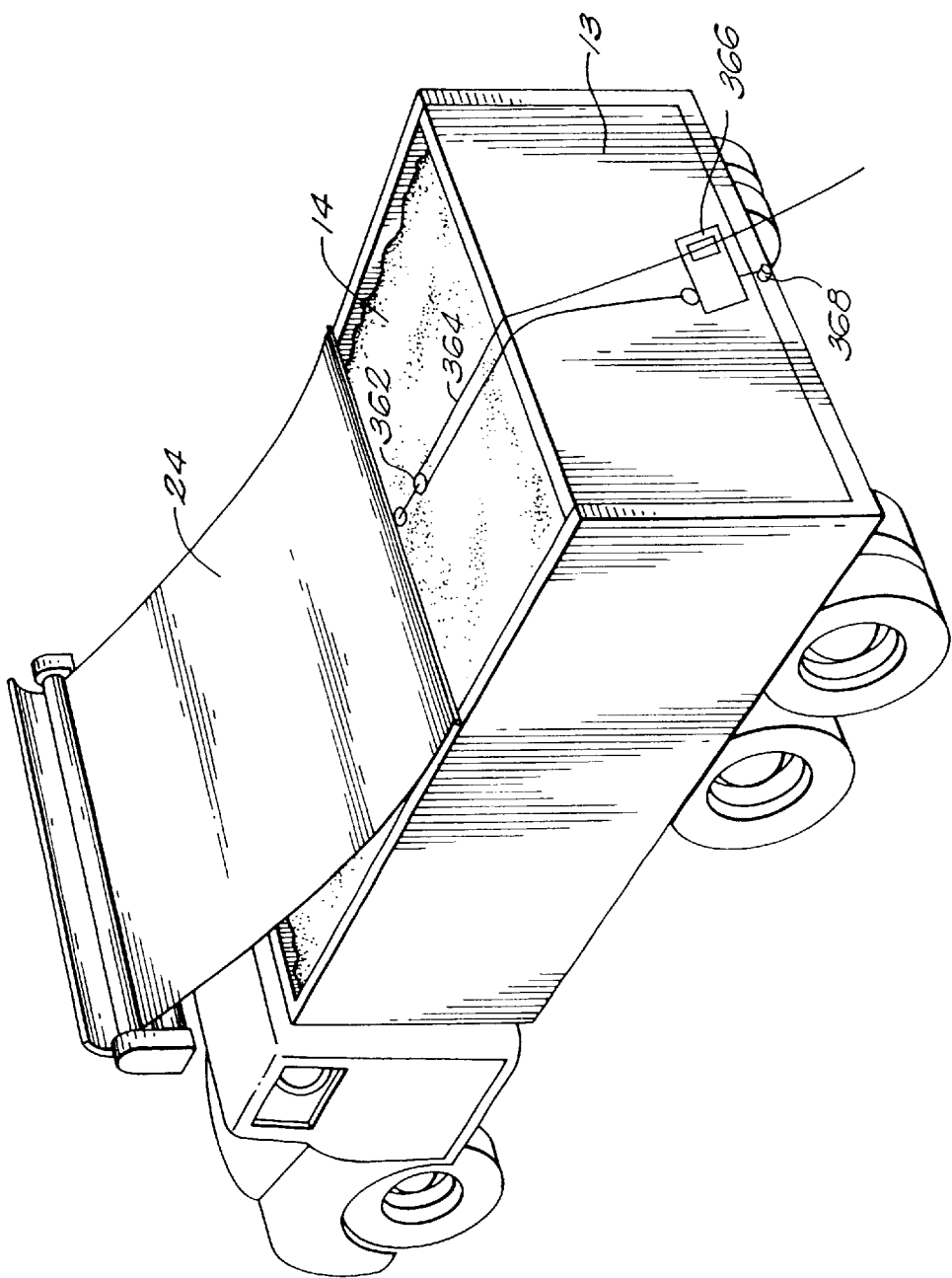
FIG. 19 is a pictorial view of a truck and container illustrating a block and tackle employed with the pull rope of the cover.

Another embodiment is shown in FIG. 19 in which a block and tackle is attached between the pull rope and end of the truck body to provide mechanical assistance in unfurling the cover. As shown in FIG. 19, a swivel block 362 is attached to the end of the cover and the rope 364 is threaded through the swivel block and through a single pulley block 366 having a snap hook 368 which is attached to an eye or other suitable fitting at the bottom of the container or truck. This pulley arrangement provides a 2:1 mechanical advantage. Other pulley arrangements may be provided for providing greater mechanical advantage, as shown for example in FIGS. 20A and 20B.

A releasable rope locking mechanism such as a jam or cam cleat or rope clutch may be provided with the pulley block or may be separately provided for the pull rope to minimize slippage of the rope and the cover unintentionally during unfurling of the cover.

The pull rope may be secured to the back of the truck body or container after the cover has been deployed over the container cover top by any convenient means such as an eye fitting or cleat.

While the invention is described through the above exemplary embodiments, it will be understood by those of ordinary skill in the art that modification to and variation of the disclosed embodiments may be made without departing from the inventive concepts herein disclosed. Specifically, while the disclosed embodiments include reference to a cover system mounted on a truck, the present invention is equally applicable to being mounted on other transport vehicles with which transport containers are employed such as trailers or train cars. Accordingly the invention should not be viewed as limited except by the scope and spirit of the pending claims.

What is claimed is:

1. A transport vehicle mounted system for covering a transport container comprising:
   a flexible cover having a first end and a second end;
   a storage assembly for storing said cover, said assembly including:
      a winding mechanism operative in a first mode and a second mode and a clutch mechanism operative to put the winding mechanism in a freewheel mode as the first mode;
      a roller attached to a first end of the cover and about which the cover can be rolled and unrolled by the winding mechanism;
   a variable height support on which said storage assembly is mounted, the support being disposed at one end of a transport container, said support being adjustable to a first height above the top of the container wherein said storage assembly is above a top of the container, and adjustable to a second height lower than said first height and below the top of the container, wherein said storage assembly is below the top of the container;
   a pull rope attached to the second end of the cover and by which the cover is unrolled over the container when the storage assembly is at the first height and the winding mechanism is in the freewheel mode;
   a fitting for removably securing the pull rope when the cover is over the container top;
   wherein the variable height support is further adjustable to the second height when said cover is fully extended over the top of the container and the pull rope is removably secured to the fitting, and the winding mechanism is operative in its second mode to roll the cover onto the roller of the storage assembly.

2. The system of claim 1 further comprising a motor coupled to said winding mechanism, said motor operable to drive said winding mechanism in a first direction to extend the cover over the top of the container.

3. The system of claim 2 wherein the motor is further operable to drive said winding mechanism in a second direction to withdraw the cover from the top of said container.

4. The system of claim 2 wherein the motor is further operable to drive said winding mechanism in the second direction to wind up excess length of the cover when the cover is extended over the top of said container.

5. The system of claim 2 wherein the motor is operable in response to a remote control.

6. The system of claim 5 wherein the remote control is wireless.

7. The system of claim 1 further comprising a pair of feeders, guiding said flexible cover onto the roller of said winding mechanisms.

8. The system of claim 7 wherein said pair of feeders are independently mounted to swivel axially in order to accommodate any variation in height between said outside edges of said cover.

9. The system of claim 1 wherein said cover includes a stiffening tube at said second end to provide stability along its width.

10. The system of claim 1 wherein said container is mounted on a truck.

11. The system of claim 1 wherein said variable height support is mounted on a dump truck body.

12. The system of claim 1 wherein the variable height support is mounted on a truck.

13. The system of claim 1 wherein said variable height support is provided by the tilt frame of a container truck.

14. The system of claim 1 wherein the winding mechanism includes a spring for spring loading the roller.

15. The invention of claim 1 wherein the winding mechanism includes a hand crank for manually operating the roller.

16. The system of claim 1 further including a mechanism for providing a mechanical advantage and coupled to the pull rope.

17. The system of claim 16 wherein the mechanism includes a capstan winch about which the pull rope is wound.

18. The system of claim 16 wherein the mechanism includes a block and tackle including the pull rope.

19. The system of claim 16 wherein the pull rope is cooperative with a releasable rope locking mechanism for preventing unintended retraction of the cover.

20. The system of claim 1 wherein the variable height support is mounted on the cab shield of a dump truck.

21. The system of claim 1 wherein the pull rope is removably attached to an end of the cover.

* * * * *